Aug. 4, 1964       R. H. HOLLROCK       3,143,323
AERIAL DEVICE WITH RETARDING ROTOR
Filed Sept. 21, 1962       5 Sheets-Sheet 1
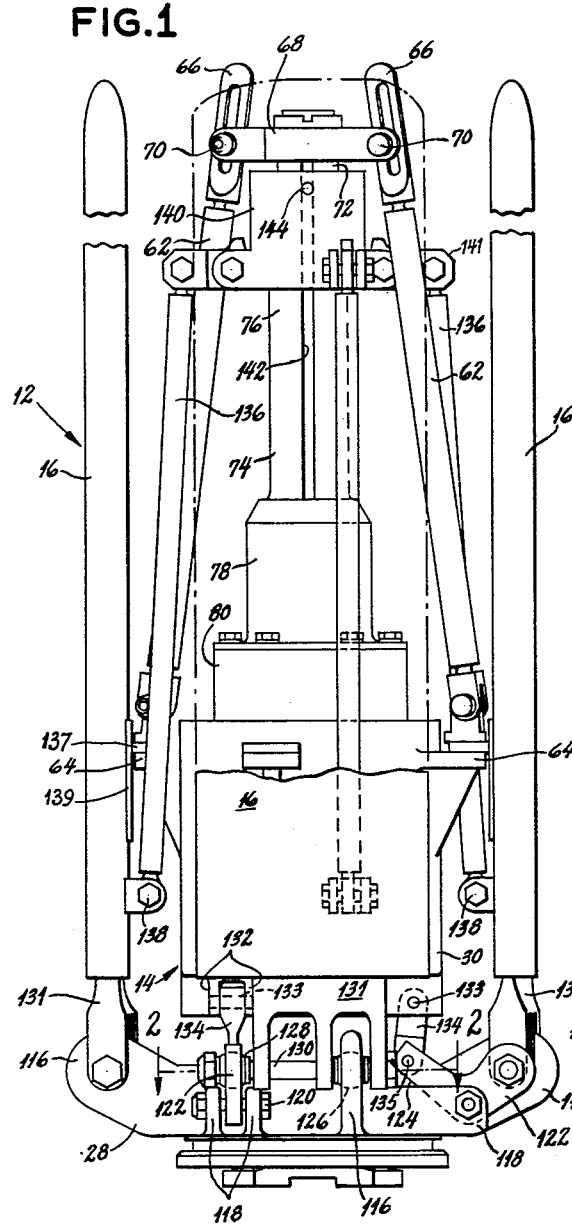
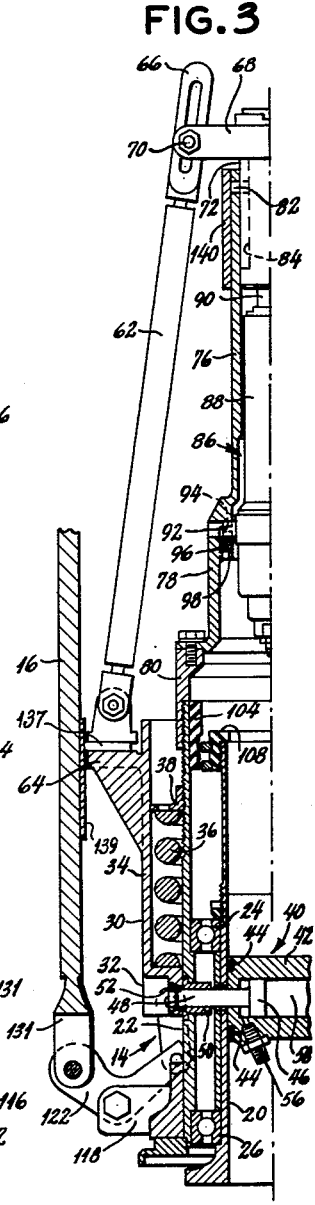
INVENTOR
RICHARD H. HOLLROCK
BY
Teller, McCormick, Paulding & Huber
ATTORNEYS Aug. 4, 1964   R. H. HOLLROCK   3,143,323
AERIAL DEVICE WITH RETARDING ROTOR
Filed Sept. 21, 1962   5 Sheets-Sheet 2

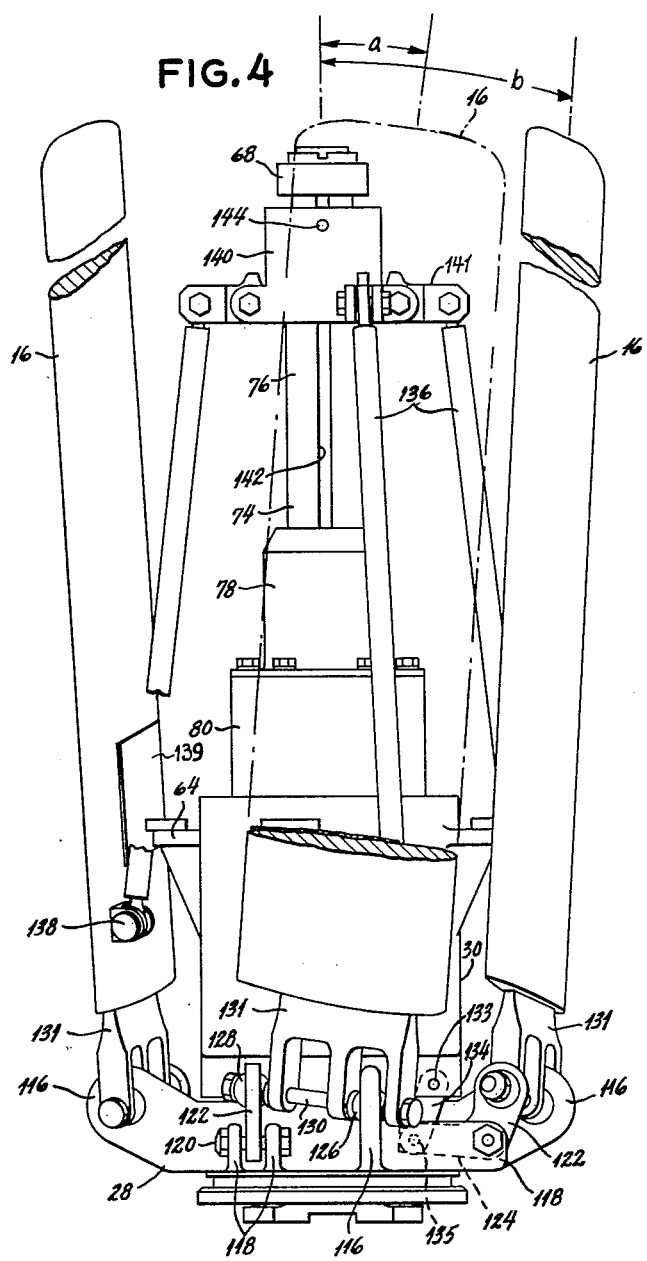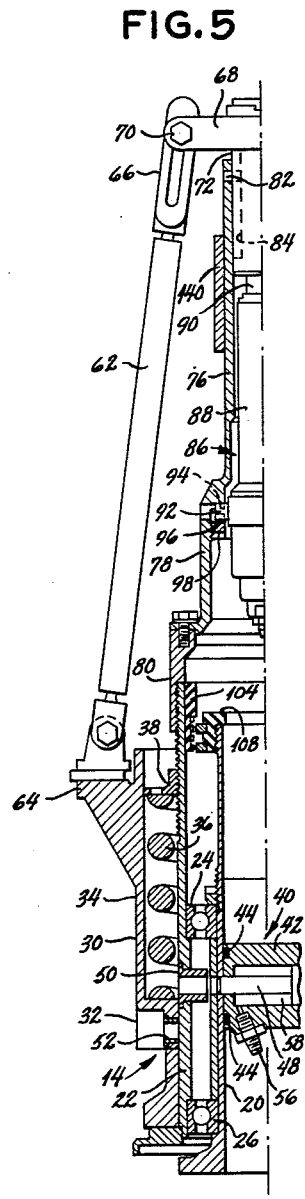

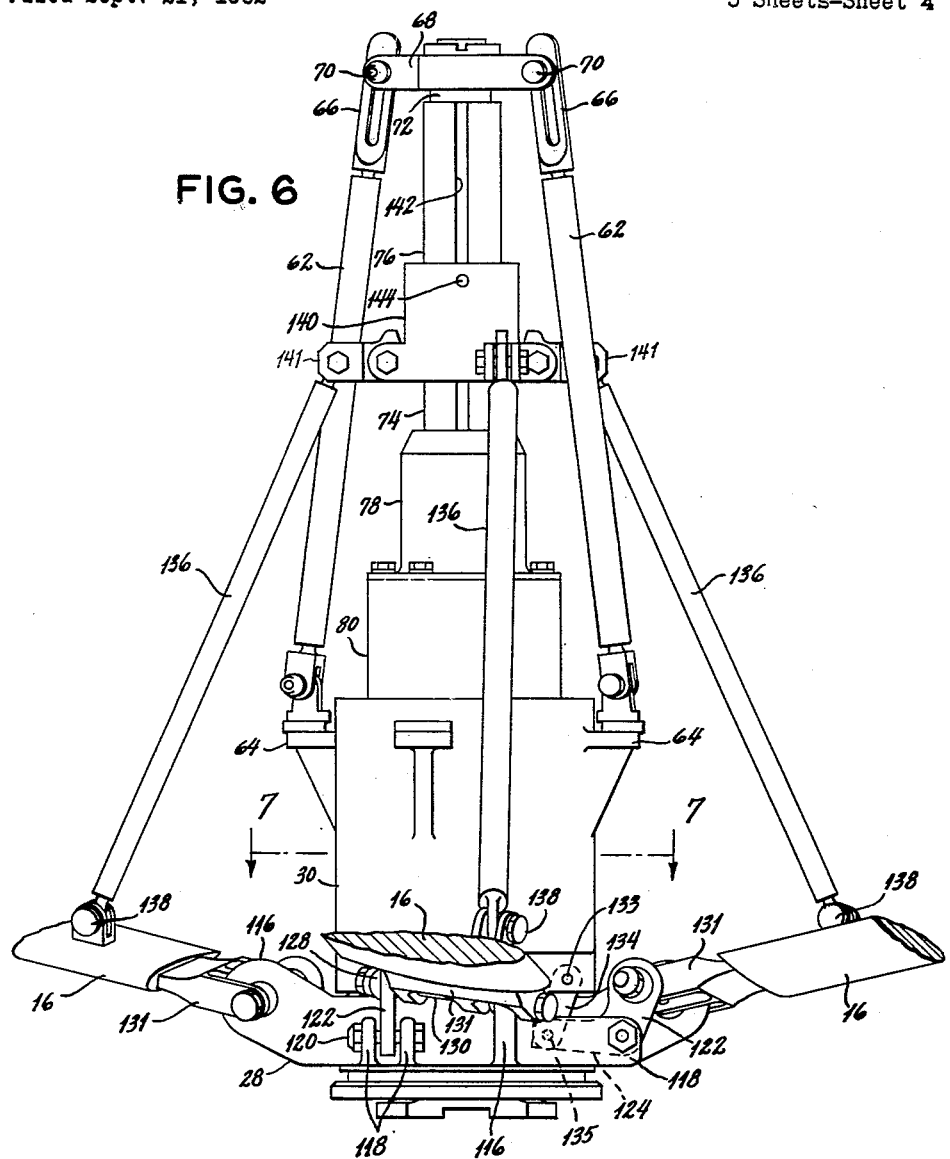

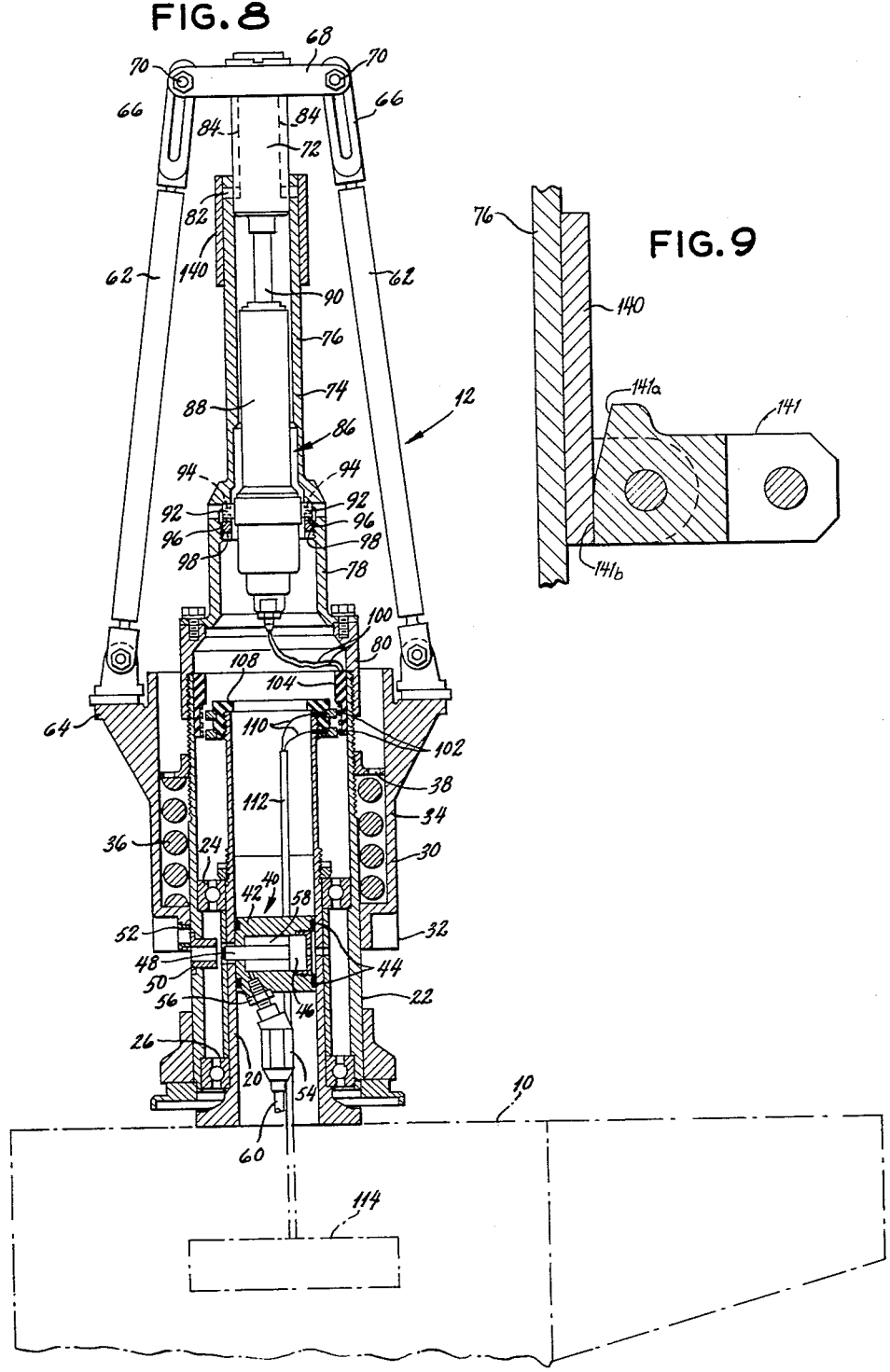

United States Patent Office 3,143,323
Patented Aug. 4, 1964

3,143,323
AERIAL DEVICE WITH RETARDING ROTOR
Richard H. Hollrock, Simsbury, Conn., assignor to Kaman Aircraft Corporation, a corporation of Connecticut
Filed Sept. 21, 1962, Ser. No. 225,209
17 Claims. (Cl. 244—138)

This invention relates to an aerial device having a rotor for retarding descent, said device being in many respects similar to that disclosed in Patent No. 3,016,217 to Polleys, Payton and Robinson issued January 9, 1962, and entitled "Aerial Device Having Rotor for Retarding Decent," and to that disclosed in Patent No. 3,017,147 to Robinson and Packard issued January 16, 1962, and entitled "Aerial Device Having Rotor for Retarding Descent."

A device embodying the invention may be called a rotary blade parachute and it is adapted for the controlled safe delivery to the ground of supplies or equipment or an article or mechanism from an aircraft or otherwise from an elevated position. The device may be carried on an aircraft and released therefrom and said device may be connected to a container or body constituting or adapted to carry a useful load, but in these respects the invention is not necessarily limited. A device embodying the invention is adapted for use at various speeds including those in the supersonic range and it may be released at either a high altitude or a low altitude after which it descends in a stable attitude.

One object of this invention is to provide a device of the type set forth having a single releasable latching device for initially retaining the blades in a folded and inoperative position.

Another object of this invention is to provide a device whereby upon the release of said latching device the blades are preconed, preswept and changed in pitch with respect to their initial inoperative positions so as to aerodynamically react with the air to cause rotation and deployment of the blades to their operative positions.

Another object of this invention is to provide a device, of the type set forth including means for collectively controlling the pitches of the blades in response to their speed of rotation to obtain an optimum rate of descent during the major portion of the descent of the device and further including means for collectively increasing the pitches of the blades as the device approaches the earth to convert the inertia of the blades into a high lift force to cause the device and its payload to be softly landed.

Other objects and advantages will be apparent during the course of the following description and from the drawings forming a part hereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a fragmentary side view of a rotary blade device embodying the present invention, this view showing the device in a vertical attitude and with its blades in their initial or folded positions.

FIG. 3 is a fragmentary vertical sectional view taken along the line 3—3 of FIG. 2.

FIG. 4 is a fragmentary side view generally similar to FIG. 1 but wherein the various parts of the rotary blade device are shown in different relative positions, said positions being those assumed immediately after the blades are released from their initial positions and before rotation is initiated.

FIG. 5 is fragmentary vertical sectional view generally similar to FIG. 3, but showing the various parts in different relative positions, these positions being the same as those shown in FIG. 4.

FIG. 6 is a fragmentary side view generally similar to FIGS. 1 and 4, but showing the various parts in still different relative positions, these positions being those assumed during the major portion of the descent of the device and after the rotor blades are fully deployed and in rotation.

FIG. 8 is a view generally similar to FIGS. 3 and 5 except for showing the various parts in still different relative positions which positions are those assumed shortly before the device engages the earth.

FIG. 9 is an enlarged vertical sectional view taken through one of the generally radial links associated with the coning synchronizer links.

Figure 2:
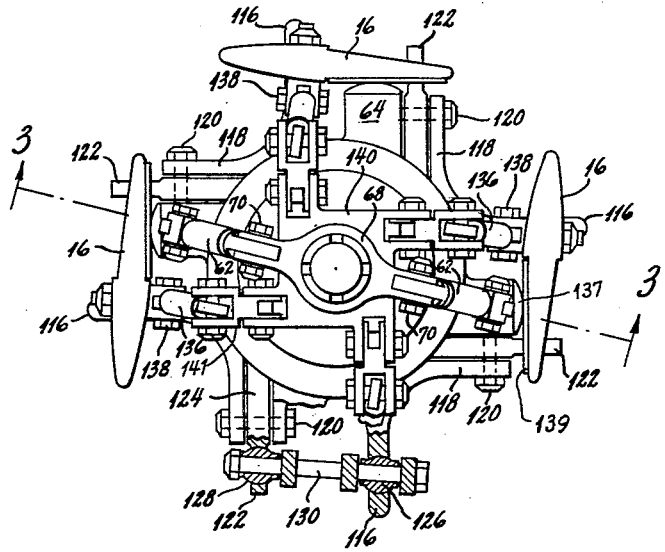
FIG. 2 is a combined plan and horizontal sectional view of the device shown in FIG. 1, the sectional portion of the view being taken along the line 2—2 of FIG. 1.

General Description of the Device and Manner of Operation

A device embodying the invention is adapted to be carried by an aircraft and is ordinarily so carried in a generally horizontal position or attitude. The device may, for example, be carried on an aircraft and released therefrom in a manner similar to that disclosed in the above mentioned Polleys, Payton and Robinson patent and more particularly disclosed in FIGS. 1, 2 and 3 thereof.

For convenience of illustration the drawings show the device in a vertical or upright attitude. However, it should be understood that the device does not ordinarily reach such upright attitude until after an appreciable time following its release, some of the hereinafter described action taking place while the device is shifting from its initial horizontal attitude to its subsequent vertical or upright attitude. For clarity, some of the parts of the device will sometimes be stated to be horizontal or vertical, reference being had to the position or attitude as shown in FIG. 1, and it will be understood that such terms are used in a relative sense only and are not intended to limit the scope of the invention.

A device embodying the invention is adapted for attachment to the rear end of a cargo or other payload carrying body, such as indicated at 10 in FIG. 8, and comprises a rotar 12 which serves as an aerodynamic retarding or braking mechanism for restricting downward movement of the body 10. The rotor 12 comprises a hub assembly 14 having attached thereto blades 16, 16. In the present instance the rotor is shown as having four blades, but it will be understood that a device embodying the invention may have a different number of blades. As shown in FIG. 8, the rotor 12 is or may be connected with the body 10 for rotation about a central axis fixed relative to the body, but the invention is not necessarily limited to such a fixed relationship between such axis and the body.

More Specific Description of the Device

As shown in FIG. 3, a vertical tube or hollow cylinder 20 is provided which constitutes a pintle and which has at its lower end a radially extending base portion adapted for connection with the body 10. The before-mentioned rotor hub assembly 14 is generally annular in shape and at its lower end includes a sleeve 22 that surrounds the cylinder 20 and is supported for rotation relative to the cylinder and by two ball bearing units 24 and 26. Fixedly secured to the sleeve 22 is a hub member 28 to which the blades 16, 16 are attached so that relative rotation of the sleeve 22 with respect to the cylinder 20 is imparted to the hub member 28 and to the blades 16, 16. Also included in the hub assembly 14 is an annular housing or synchronizer 30 which surrounds the sleeve 22 and has a lower end portion 32 which slidably engages the outside surface of the sleeve 22 so as to support and guide the housing for vertical movement relative to the sleeve. The upper portion 34 of the housing 30 is radially spaced from the sleeve 22 and defines with said sleeve an annular chamber which receives a helical compression spring 36. The upper end of the spring 36 engages an annular retaining member 38 which is threadably received on the upper portion of the sleeve 22. The lower end of the spring 36 engages an annular shoulder formed in the bottom portion of the housing 30. From FIG. 3, it will therefore be understood that the spring 36 tends to urge the housing 30 downwardly relative to the sleeve 22 and that by adjusting the retaining member 38 the initial tension or preload of the spring may be varied as desired.

In FIG. 3 the housing 30 is shown in its initial or raised position relative to the sleeve 22 and it is held in such initial position by a releasable latching device indicated generally at 40. As shown best in FIGS. 3 and 8, this latching device comprises a generally cylindrical body 42 received in the bore of the cylinder 20 and vertically held in place relative thereto by the frictional forces developed by two O-rings 44, 44 located in circumferential grooves formed in the outer surface of the body. Provided in the body is a transverse cylindrical bore which slidably receives a piston 46 having formed integral therewith a retaining pin 48. When the retaining pin is in the position shown in FIG. 3 it extends radially outwardly through the body 42, through the cylinder 20, and through or at least partially through bushings 50 and 52 fixed respectively to the sleeve 22 and to the housing 30. Thus, when in its latched or FIG. 3 position, the retaining pin 48 prevents the sleeve 22 and the rest of the hub assembly from rotating relative to the cylinder 20 and also holds the housing 30 in its initial raised position relative to the sleeve.

The latching device 40 is released by movement of the retaining pin 48 radially inwardly or to the right as viewed in FIG. 3, and this in the illustrated instance is accomplished by means of an explosive charge or cartridge. As shown in FIG. 8, an explosive cartridge containing unit 54 is connected with the latch body 42 by a connector 56 which serves to conduct gases of explosion generated in the unit 54 to the piston chamber 58 defined by the piston 46 and the transverse bore in the body. As a result of the pressure produced by these gases, the piston 46 and pin 48 are moved radially inwardly or toward the right to the released positions shown in FIGS. 5 and 8. A suitable detent or shear element (not shown) is or may be used to hold the piston 46 in the initial position shown in FIG. 3 until the cartridge unit 54 is fired and another suitable detent (not shown) is or may be used to hold the same in its released position after the cartridge unit is fired. Electric wires in a cable 60 serve upon closing of the circuit to ignite the cartridge in the unit 54 to effect releasing movement of the piston and retaining pin, and such circuit may, for example, be substantially the same as that shown in the said Robinson and Packard patent, more particularly in FIG. 1 thereof, wherein the circuit is closed by means of a static chord operated mechanism shortly after the body 10 is released from the aircraft.

As mentioned above, the housing 30 or synchronizer is vertically movable relative to the sleeve 22 and is initially held in a raised position by the retaining pin 48. After the retaining pin is released by ignition of the cartridge unit 54, it is moved downwardly relative to the sleeve 22 by the action of the spring 36 and serves as hereinafter described to regulate and equalize the pitches of the four blades 16, 16 during the major portion of the descent of the aerial device. Means, however, are also provided for returning the housing 30 from its lowered position to a raised position at the terminal portion of the descent. Referring to FIGS. 1, 2, 3, and 8, this means comprises two generally axially or vertically extending lifting arms 62, 62 each of which is pivotally connected at its lower end to a radially extending lug 64 formed integral with or otherwise fixed to the housing 30. The upper end of each arm 62 is provided with a longitudinally slotted member 66 which is connected to a corresponding bifurcated arm on a spider 68, this connection being provided by a bolt 70 which passes through the bifurcations of the arm and through the slot in the member 66. The spider 68 is in turn fixed to the upper end portion of a generally cylindrical slide 72 received by and guided for vertical movement within the bore of a hollow stem member 74 which stem is arranged coaxial with the central axis of the rotor and comprises part of the hub assembly 14. The stem member 74 includes an upper portion 76 having a cylindrical outer surface and a bottom portion 78 which is of larger internal and external diameters than the upper portion 76 and which is attached to the sleeve 22 by a connecting member 80. The stem member 74 is bolted to the connecting member 80 as shown and the latter member is threadably connected with the sleeve 22.

The slide 72 is prevented from rotating relative to the stem member by two pins 82, 82 fixed to the upper end of the stem and including radially inwardly extending portions which are received by corresponding vertical slots 84, 84 formed in the outer surface of the slide. FIGS. 1 and 3 show the slide 72 in its lowered or retracted position and FIG. 8 shows the same slide in its raised or extended position. Movement of the slide between these two positions is in the present instance accomplished by an explosive charge device in the form of a thruster 86. The thruster 86 is or may be of a design well known in the art and comprises a body 88 having an axially movable rod 90 extending from the upper end thereof and fixed to the lower end of the slide. The rod 90 is connected to a piston within the body 88 and is moved upwardly relative to the body by the pressure of gases generated by the ignition of a cartridge or other explosive charge within the body. The thruster is located within the bore of the stem member 74 and is retained in place by two trunnions 92, 92 which are integral with or otherwise fixed to the thruster body. The upper surface of each trunnion 92 engages a correspondingly curved and radially extending seat 94 provided in the stem 74 and the lower portion of each trunnion engages a corresponding seat formed in an annular member 96 which surrounds the thruster body. The member 96 is in turn held in place by an annular retaining member 98 which is threadably engaged with the bore of the lower portion 78 of the stem.

Ignition of the explosive charge within the thruster is effected by the closing of an electric circuit which transmits an igniting current to the thruster through the wires 100, 100 connected thereto. This current is transmitted to the wires 100, 100 through a slip ring and brush assembly including slip rings 102, 102, fixed relative to the sleeve 22 by an electrical insulating member 104, and brushes 106, 106 fixed relative to the sleeve 22 by another electrical insulating member 108. The brushes 106, 106 are in turn connected to wires 110, 110 forming part of a cable 112 which passes through a suitable opening in the body of the latching device 40 and leads to a device 114 contained within the body 10 for closing the electrical circuit to ignite the thruster shortly before the aerial device engages the earth. The ignition device 114 by itself forms no part of this invention and may take various suitable forms depending on the use to which the aerial device is put. For example, the device 114 could be a preprogrammed unit adapted to close the ignition circuit a predetermined time after the release of the device from the aircraft. Alternatively, it could also be a radio device adapted to close the ignition circuit upon the receipt of a command signal from a ground control station, or a self-contained altimeter for measuring the distance to the earth and for closing the circuit when the aerial device reaches a predetermined low altitude.

Means for connecting each blade 16 to the hub member 28 is substantially the same as that disclosed in the above mentioned Robinson and Packard patent. Referring more particularly to FIGS. 1 and 2, the hub member 28, for each blade, is provided with an integral blade connecting flange 116 and with two companion integral blade connecting flanges 118, 118. The flange 116 is at one side of a vertical plane passing through the central axis of the rotor and through the center of the associated blade 16, the flanges 118, 118 being at the other side of the plane. Mounted on the pair of flanges 118, 118 and for movement about a horizontal axis at 120 is a lever 122 having an inwardly extending arm 124. Carried in the openings in the outer end of the flange 116 and in the outer end of the lever 122 are fitted balls 126 and 128 respectively, said balls being apertured to receive and fit a pivot pin 130. Each blade 16 at its inboard or lower end has a blade support 131 fixedly connected thereto which blade support is apertured to receive and fit the pivot pin 130. As best shown in FIG. 1, the blade support 131 is notched to receive the flange 116 and the corresponding ball 126.

The axis of each pin 130 constitutes a transverse coning or flapping axis for the corresponding blade. The two balls 126 and 128 associated with each blade, and which carry the associated pin 130, constitute a pair of blade supports, one of which is pivotally movable outwardly and downwardly or inwardly and upwardly relative to the other support. As hereinafter more fully explained the movement of one of the balls relative to the other ball will, when the blades are deployed and in rotation about the central axis of the rotor, change the blade pitch. The same movement of one of the balls relative to the other ball will also, when the blades are in their folded or initial positions, change the sweep angle of the associated blade and will cock the blade by rotating the same about its spanwise pitch changing axis to change the angle, sometimes referred to hereinafter as the horizontal chord angle, between the chord of the same blade and the radial or vertical plane passing through the central axis of the rotor and the longitudinal center of the pin 130 as measured on a horizontal plane. Said sweep angle is the angle between the longitudinal center line of the blade and the central axis of the device as measured on a vertical plane perpendicular to said latter vertical plane. In the present instance the ball 128 carried by the lever 122 is the ball that is moved to change the blade pitch, the sweep angle and the horizontal chord angle and the leading ball 126 is the relatively fixed ball. In the present instance the rotor rotates in the counterclockwise direction as viewed in FIG. 2 and therefore each movable ball 128 supports the corresponding blade near its trailing edge, whereas each ball 126 supports the corresponding blade near its leading edge. The leading edge ball 126 provides a pivot point about which the corresponding pin 130 is moved when the other ball or support 128 is moved.

The bottom portion 32 of the housing 30 for each blade includes two flanges 132, 132 to which is pivotally connected at 133 the upper end of a link 134, the link having its lower end connected to the radially inner end of the arm 124 of the link 122, as at 135, with the result that the vertical movement of the housing relative to the sleeve 22 is imparted by the link 134 to the lever 122 to cause rotation of the same about its axis 120. When the housing 30 is in its initial or raised position shown in FIG. 1, the links 134, 134 hold the levers 122, 122 in such positions that each pin 130 is positioned substantially horizontal, as shown best in FIG. 1, and substantially perpendicular to a radial plane passing through the central axis of the rotor and the longitudinal center of the pin, as shown in FIG. 2. As mentioned previously, the housing 30 is retained in its raised position and the sleeve 22 is prevented from rotating relative to the cylinder 20 by the retaining pin 48 of the latching device 40. When the housing is in this initial position the blades 16, 16 are folded so as to extend rearwardly in generally parallel relationship with the central axis of the rotor and have substantially zero coning angles, substantially zero sweep angles and substantially 90° horizontal chord angles.

When the latching device 40 is released to allow the housing 30 to move downward under the action of the spring 36, the corresponding downward movement of the links 134, 134 moves the levers 122, 122 in such a direction as to raise each trailing ball or support 128 relative to its associated leading ball or support 126 and thereby inclines the pins 130, 130. When the blades are at or near their folded positions this raising of the balls 128, 128 has the effect of moving the outboard end of each blade forwardly in the intended direction of rotation. That is, the blade is swept forwardly through a sweep angle such as the angle *a* shown in FIG. 4. The same downward movement of the housing 30 also moves each trailing ball inwardly toward the central axis of the rotor, relative to the associated leading ball, and this has the effect of changing the horizontal chord angle of each blade whereby the blade is cocked in such a direction that the leading edge of the blade is moved away from said central axis and the trailing edge is moved toward said central axis. As the blades reach their fully deployed positions at which they extend substantially radially outwardly from the central axis at a relatively large included coning angle, the vertical inclination of the pins 130, 130 has little influence on the sweep of the blade, but instead effects the pitch of the blades. This will be best appreciated from FIG. 6 which shows the blades in or near their deployed positions. Moving the trailing balls 128, 128 upwardly from the positions shown in FIG. 6 has the effect of decreasing the blade pitches (that is, making the blade pitches more negative) while moving the same balls downwardly will have the effect of increasing the pitches. As the speed of rotation increases the centrifugal force imposed on the blades rotates the levers 122, 122 to move the trailing balls downwardly from the positions shown in FIG. 6 to increase the pitches of the blades and therefore achieve the most efficient retarding force. During autorotation the blades may assume slightly positive pitch angles in the order of three degrees.

From this it will be appreciated that when the blades 16, 16 are first moved from their folded positions by the release of the housing 30, they are moved through given sweep angles and horizontal chord angles which movements are synchronized by the housing 30 so that all blades are swept and cocked by equal amounts. Likewise, after the blades are deployed the pitches thereof are equalized or synchronized in the same manner by the housing 30 and its associated parts.

In addition to the above described means for utilizing the downward relative movement of the housing 30 to sweep forward and cock the blades 16, 16 during the initial phases of their deployment, means are also provided in accordance with this invention for utilizing the same downward movement of the housing to pre-cone the blades. In the illustrated instance this means includes four radially extending cams 137, 137 fixed to the housing 30 and arranged so that the outer end of each engages a plate 139 on a respective one of the four blades, this being shown best in FIGS. 1 and 2. The arrangement of the cams 137, 137 and the plates 139, 139 is such that when the housing 30 is in its raised or initial position said elements coengage to prevent the outboard or upper ends of the blades 16, 16 from moving inwardly toward the central axis of the rotor beyond the parallel positions shown in FIG. 1. From FIG. 1 it will also be noted that due to the parallel positions of the blades 16, 16 the cam plates 139, 139 are also parallel to the central axis of the rotor, and that if these cam plates were maintained in this position downward movement of the cams 137, 137 would have no effect on the coning angles of the blades. However, the cam plates 139, 139 do not remain in such parallel positions as the housing 30 moves downwardly. As mentioned previously, the downward movement of the housing 30 rotates the levers 122, 122 in such directions as to move the trailing balls 128, 128 inwardly toward the central axis of the rotor. As a result of this inward movement of the lower end of each blade, the upper or outboard end of the blade is moved outwardly away from the central axis of the device with the associated cam 137 acting as a fulcrum. As the cams 137, 137 move downwardly the leverage ratio is changed in such a manner as to increase the outward or coning movement of the blades produced by the inward movement of the balls. Therefore, after the housing 30 reaches its lower position the blades are not only swept forwardly and cocked, but are also coned outwardly by an appreciable coning angle $b$ with respect to the central axis, this condition being shown in FIG. 4.

After the blades reach the positions shown in FIG. 4 it will be understood that the air striking the under surface of each blade produces a resultant force on the blade having a horizontal component which, due to the swept and cocked condition of the blade, acts along a line which does not intersect the central axis of the rotor and which therefore imposes a torque on the blade and hub assembly tending to rotate the blades and hub assembly in the leading direction or counterclockwise as viewed in FIG. 2. As the blades 16, 16 begin to rotate as a result of this torque centrifugal force urges the outboard end of each blade outwardly away from the central axis to increase its coning angle.

The coning angles of the blades are preferably maintained substantially equal during the opening or deploying movement thereof while each blade is nevertheless free to flap to a limited extent relative to and independently of the other blades during autorotation. To achieve this each blade 16 has associated therewith a link 136 having one end connected to the blade near the inboard end of the latter by a universal connection indicated at 138. The links 136, 136 have their other or upper ends respectively universally connected with the outer ends of short generally radially extending links 141, 141 which links have their inner ends pivotally connected with a synchronizer bushing 140 which is slidably mounted on the upper portion 76 of the stem member 74 for vertical reciprocating movement. As shown in FIG. 9 each link 141 is provided on its inner end with two stop surfaces 141a and 141b which are engageable with the synchronizer bushing 140 to limit the pivoting motion of the link. In FIG. 9 the illustrated link is shown in its lowermost position whereat the surface 141b engages the synchronizer bushing. From this position the link is movable upwardly approximately 15° to the point where the surface 140a engages the synchronizer bushing. The synchronizer bushing is restrained against rotative movement relative to the stem member by means of a vertical slot 142 formed in the stem member and a pin 144 fixed to the synchronizer bushing and including a portion entered into the slot 142. From this it will be understood that the outward coning movements of the four blades are synchronized or equalized by means of the links 136, 136 and the synchronizer bushing 140 so that all four blades are at all times maintained at substantially equal coning angles relative to the central axis during the deployment of the blades. The movement of the links 141, 141 relative to the synchronizer bushing however allows the blades to flap to a limited extent independently of one another during autorotation and therefore allows the rotor hub assembly 14 to be tilted relative to the body 10 with a relatively small degree of force and without encountering a gyroscopic effect. This is desirable in instances where the hub assembly is tilted relative to the body for the purpose of guiding the flight of the body and the attached retarding device. In other instances, however, it may not be necessary to tilt the hub assembly, in which case the upper ends of the links 136, 136 may be attached directly to the synchronizer bushing 140. It should be noted that the links 136, 136 also act to limit the downward movement of the blades and therefore help to prevent the blades from striking the ground on landing.

*Manner of Operation*

When the device is released from an aircraft it continues in forward motion at high speed, the direction of forward motion being initially generally axial and gradually shifting from horizontal to vertical. At the moment of release the blades 16, 16 and the other parts of the rotor mechanism are in the initial positions shown in FIGS. 1, 2, and 3, at which positions the blades extend rearwardly in parallel relationship to the central axis of the device with zero sweep and coning angles. As a result of this disposition of the blades no turning moments are imparted on the rotor by the air through which it passes.

At a predetermined time after such release the explosive charge or cartridge within the unit 54 is fired, as by a static chord actuated mechanism, with resultant withdrawal of the retaining pin 48 of the latching device 40. With the pin 48 so withdrawn the housing or synchronizer 30 moves downwardly relative to the sleeve 22 and the latter sleeve is free to rotate relative to the cylinder 20. FIGS. 4 and 5 show the relative positions occupied by the various parts of the rotor immediately after the movement of the housing to its lowered position and such positions of the blades are sometimes hereinafter referred to as "second positions."

When the blades are in said second positions, each blade as shown in FIG. 4 is swept forwardly in the leading direction by a sweep angle $a$, is cocked so that the leading edge is located further away from the central axis than the trailing edge, and is also coned outwardly from the central axis by an appreciable coning angle. As the housing 30 moves downwardly on the sleeve 22 it, through the links 134, 134, rotates the levers 122, 122 in such directions as to move the trailing balls 128, 128 upwardly and radially inwardly. The upward movement of each trailing ball effects said sweeping of the associated blade through the sweep angle $a$ by inclining the hinge pin 130 relative to the horizontal. The inward movement of each trailing ball 128 changes the horizontal chord angle of the associated blade to cock the same in the described direction and together with the downward movement of the cam 137 bearing against the plate causes the outboard end of the blade to be cammed outwardly about the axis of the pin 130 to produce the described coning of the blade.

Due to the coning, sweep and chord angles imparted to the blades upon the release of the housing 30, the continued high forward speed of the device causes the impact of the air on the blades to impart a turning moment on the hub which causes the hub and the blades to rotate in the leading direction at rapidly increasing speeds. As the rotative speeds increase, the centrifugal forces acting on the blades increase the coning angles and as this takes place the blades take on negative pitch angles due to the inclination of the hinge pins 130, 130 to the horizontal, and this tends to still further increase the rotative speed of the blades and rotor. As the coning angles reach relatively large values whereat the blades extend substantially radially outwardly from the central axis, the centrifugal forces acting on the blades tend to move the trailing balls 128, 128 outwardly. These outward forces applied to the balls 128, 128 turn the levers 122, 122 in the direction to move the balls not only outwardly but also downwardly, the inner lever arms 124, 124 being moved upwardly in opposition to the spring 36. The downward components of the last said bodily movements of the balls 128, 128 serve to move the trailing edges of the blades relatively downwardly with a resulting decrease in the initially large negative pitch angles of the blades The last said downward movement of the balls 128, 128 and upward movements of the arms 124, 124 are opposed by the spring 36 and a condition of equilibrium will be reached whereat the centrifugal action on the balls is exactly balanced by the downward pressure applied by the spring.

Pitch changes that decrease negative pitch angles or increase positive pitch angles are referred to as effected "positively" or "in the positive direction." Pitch changes that decrease positive pitch angles or increase negative pitch angles are referred to as effected "negatively" or "in the negative direction."

Figure 7:
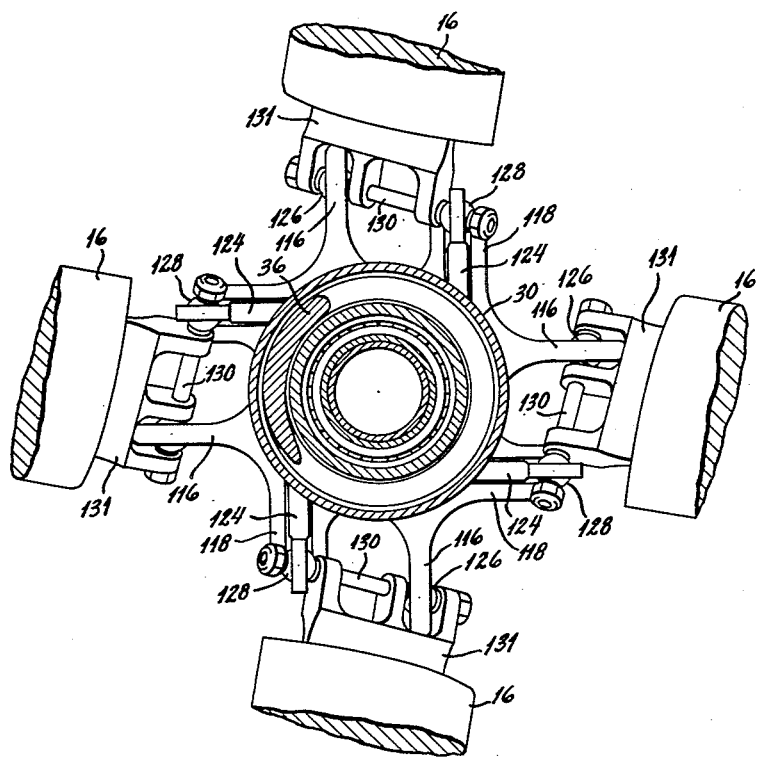
FIG. 7 is a fragmentary horizontal sectional view taken on the line 7—7 of FIG. 6.

By centrifugal force and in the manner described, the parts are moved from the second positions shown in FIGS. 4 and 5 to the positions shown in FIGS. 6 and 7. The last said positions are sometimes referred to hereinafter as the "third positions." At such third positions the included coning angle has been substantially increased and the synchronizer bushing 140 has been moved downwardly on the stem 74 by the links 136, 136. When the blades are in the third positions shown in FIGS. 6 and 7, the spring 36 by balancing the centrifugal forces applied to the levers 122, 122 exerts a governing action on the speed of rotation. Assuming that the blades are rotating at a given speed and that a condition of equilibrium has been reached with respect to the spring 36, any increase in the speed of rotation will increase the centrifugal forces applied to the levers 122, 122 and these increased forces will move the balls 128, 128 outwardly and downwardly against the force of the spring. The downward movement of each ball moves the trailing edge of the blade downwardly to positively increase the pitch angle of the blade. This increase in pitch angle in turn decreases the speed of rotation thereby decreasing the centrifugal force and tending to cause the balls 128, 128 to move upwardly and inwardly to their prior equilibrium positions. The rotor speed and blade pitch which are maintained by the governing action of the spring may be adjusted by varying the preload on the spring by adjusting the axial position of the spring retainer 38 relative to the sleeve 22. It will also be noted that as the housing or synchronizer 30 moves downward from its initial position and as it moves relative to the sleeve 22 during the governing action, the slots 84, 84 in the connecting members 80, 80 at the upper ends of the lifting arms 62, 62 provide lost motion connection with the slide 72 whereby these motions are unrestrained by the slide when the latter is in its lowered position.

The third positions of the blades, as shown in FIGS. 6 and 7, are the normal deployed positions which are maintained during the course of the major portion of the descent of the aerial device. Due to the negative pitch angles applied to the blades 16, 16 the blades and hub assembly autorotate and produce a lift force which slows or retards the descent of the device. Nevertheless, even though the blades 16, 16 do considerably retard the device, the speed of vertical fall or descent is still sometimes great enough to cause damage to the body or case 10 and/or its payload or cargo when the device strikes the ground. In the present instance, however, this occurrence is prevented by converting the rotary inertia of the blades into a greatly increased lift force shortly before the device engages the ground, thereby still further slowing the descent of the device and providing for a soft landing.

This latter action is accomplished by the ignition of the explosive charge or cartridge in the thruster 88 by the device 114 in response to a suitable externally or internally generated command signal. Ignition or firing of the thruster moves its rod 90 and the associated slide 72 upwardly and this upward movement of the slide, through the lifting arms 62, 62, raises the housing or synchronizer 30 relative to the sleeve 22 and to a point located somewhat above its initial or FIG. 3 position, the position of the housing 30 after the firing of the thruster being shown in FIG. 8. From consideration of FIGS. 3 and 8 it will be appreciated that this raising of the housing 30 rotates the levers 122, 122 in such directions and to such extents as to move the trailing balls 128, 128 downwardly to a level below the leading balls 126, 126 with the result that the pitch angles of the blades are changed from negative to positive values. With the blades at these positive pitch angles the rotary inertia of the blades sustains the rotor rotation and the lifting force produced by the blades and imposed on the body is greatly increased with the result that the body is slowly and softly landed on the ground. The thruster and its associated parts are therefore seen to comprise means for overriding the governing or pitch regulating function of the spring 36 so as to convert the inertia of said blades into an increase lift force.

The invention claimed is:

1. In an aerial device for retarding the descent of a body, the combination comprising a normally vertical pintle connectible with said body and having a central axis, a hub connected with said pintle for rotation about said central axis and including a vertically extending stem coaxial with said central axis, a plurality of generally radial blades connected at their inboard ends with said hub for pivotal movements about flapping axes arranged generally transverse of said central axis, a coning synchronizer bushing carried by said central stem and vertically slidable relative thereto, a plurality of synchronizer links, first means connecting one end of each of said synchronizer links to said synchronizer bushing so as to move vertically with said bushing, and second means pivotally connecting the other end of each of said synchronizer links to a respective one of said blades, said first means comprising a plurality of links each pivotally connected at one end to an associated synchronizer link and at the other end connected to said synchronizer bushing for limited pivotal movement relative thereto about a generally horizontal axis.

2. In an aerial device for retarding the descent of a body, the combination comprising a normally vertical pintle connectible with said body and having a central axis, a hub member connected with said pintle for rotation about said central axis, a plurality of generally radial blades connected at their inboard ends with said hub member for movements about spanwise pitch changing axes, a blade pitch control means for automatically and uniformly varying the pitches of said blades in response to the centrifugal forces imposed on said blades to provide said blades with suitable pitch angles to cause autorotation at a desired speed of rotation, and means for overriding said automatic pitch control means and for uniformly increasing the pitches of said blades so as to convert the rotary inertia of said blades into an increased lift force on said body.

3. The combination defined in claim 2 further characterized by said blade pitch control means including a spring and a synchronizer member slidable vertically relative to said hub member between first and second positions and biased toward said first position by said spring, and a plurality of linkages each connected between said synchronizer member and a respective one of said blades and operable to move the associated blade to increased pitch angles as said synchronizer member moves toward said second position against the force of said spring, said linkages being so constructed and arranged that at least a part of the centrifugal force imposed on each blade is transmitted through the associated linkage and is opposed by said spring and synchronizer member with increases in the centrifugal force tending to move said synchronizer plate toward said second position and to thereby increase the pitch angles of said blades, and said means for overriding said pitch control means including means separate from said linkages for moving said synchronizer member toward said second position against the force of said spring.

4. The combination defined in claim 3 further characterized by said spring being a helical compression spring surrounding said hub and extending axially thereof with one end in engagement with said synchronizer member, a retainer adapted to engage the other end of said spring, and means for adjusting said retainer axially of said hub to vary the preload of said spring.

5. In an aerial device for retarding the descent of a body, the combination comprising a normally vertical pintle connectible with said body and having a central axis, a hub connected with said pintle for rotation about said central axis and including a vertically extending hollow stem coaxial with said central axis, a plurality of generally radial blades connected at their inboard ends with said hub for movements about spanwise pitch changing axes, a synchronizer member slidable vertically relative to said hub between upper and lower positions and biased toward said lower position by a spring, a plurality of linkages each connected between said synchronizer member and a respective one of said blades and operable to move the associated blade to increased pitch angles as said synchronizer member moves toward said upper position against the force of said spring, said linkages being so constructed and arranged that at least a part of the centrifugal force imposed on each blade is transmitted through the associated linkage and is opposed by said spring and synchronizer member with increases in the centrifugal force tending to move said synchronizer member upwardly and to thereby increase the pitch angles of said blades, a slide mounted in the hollow bore of said stem for reciprocating movement relative thereto between upper and lower positions, and means connecting said slide to said synchronizer member for moving said synchronizer member upwardly in response to upward movement of said slide.

6. The combination defined in claim 5 further characterized by said means connected between said slide and said synchronizer member comprising a plurality of generally axially extending lifting arms each of which lifting arms is pivotally connected at one of its ends to one of said latter parts and is connected at its other end to the other of said parts by a lost motion device to permit said synchronizer member to move axially relative to said hub between its upper and lower positions without restraint by said arms when said slide is in its lower position.

7. The combination defined in claim 6 further characterized by an explosive actuated device located within said hub for moving said slide from its lower to its upper position.

8. The combination defined in claim 7 further characterized by means carried by said body for producing an electric signal for igniting said explosive actuated device, and means including a slip ring and brush assembly between said pintle and said hub for transmitting said electric signal to said explosive actuated device.

9. The combination defined in claim 6 further characterized by means connecting said blades to said hub for movement about flapping axes arranged generally transverse of said central axis, a coning synchronizer bushing carried by said central stem and vertically slidable relative thereto, and a plurality of synchronizer links each connected at one end to said synchronizer bushing for vertical movement therewith and at its other end pivotally connected to a respective one of said blades at a point located outwardly from the associated flapping axis.

10. The combination defined in claim 9 further characterized by a plurality of generally radial links associated with said synchronizer links each of which generally radial links is pivotally connected at one end to said one end of an associated synchronizer link and is supported at its other end for limited pivotal movement relative to said synchronizer bushing above a generally horizontal axis.

11. In an aerial device for retarding the descent of a body, the combination comprising a hub adapted for rotation relative to said body about a central axis, a plurality of blades connected at their inboard ends with said hub for pivotal movements about flapping axes arranged generally transverse of said central axis and which blades are movable about said flapping axes between first positions whereat said blades are disposed substantially parallel to said central axis and second positions whereat said blades are coned outwardly from said central axis, a member carried by said hub and axially slidable thereon between first and second positions and which member is in said first position when said blades are in their said first positions, and means defining cooperating cam surfaces between said blades and said axially slidable member which cam surfaces are so constructed and arranged as to force said blades away from said central axis and toward said coned positions as said member is moved from its first to its second position.

12. The combination defined in claim 11 further characterized by a spring arranged to urge said slidable member toward its second position, and a releasable latching means for holding said member in its first position against the force of said spring so that upon release of said latching means said spring moves said member toward its second position.

13. The combination defined in claim 11 further characterized by a normally vertical pintle connectible with said body, means connecting said hub to said pintle for rotation relative thereto, and said latching means including a device carried by said pintle and initially engaging said hub to prevent its rotation relative to said pintle and also engaging said slidable member to retain the latter in its said first position, and means for releasing said device to disengage it from said hub and from said sliding member to permit rotation of said hub and movement of said sliding member.

14. In an aerial device for retarding the descent of a body, the combination comprising a hub adapted for rotation relative to said body about a central axis, a plurality of blades connected at their inboard ends with said hub for pivotal movements about flapping axes arranged generally transverse of said central axis and movable between first positions whereat said blades are disposed substantially parallel to said central axis and second positions whereat said blades extend generally radially outwardly from said central axis, a member carried by said hub and axially slidable relative thereto between first and second positions, said member and said blades being initially in their said first positions and said member including a plurality of parts each of which engages the inwardly facing surface of a respective one of said blades, means for moving the inboard ends of said blades inwardly toward said central axis so that the outboard ends thereof are coned outwardly from the central axis by such inward movement of the inner ends with said parts acting as fulcrums, and means for moving said sliding member from its first to its second position to cause additional outward coning movement of said blades by movement of said parts relative to said blades.

15. The combination defined in claim 14 further characterized by said means for moving the inboard ends of said blades inwardly comprising means connected with said sliding member and responsive to the movement thereof so that said inward movement of said inboard ends of said blades and said movement of said parts relative to said blades occur simultaneously.

16. An aerial device for retarding the descent of a body which device includes a rotor connectible with the body to be retarded and rotatable about a central normally vertical axis and in a predetermined direction which rotor includes a hub and also includes a plurality of generally radial blades, said rotor further including pivot means connecting the blades with the hub for pivotal movements about generally transverse flapping axes which blades have equal pitch angles providing suitable angles of air attack for causing autorotation of said rotor in said direction as the device descends, means on said rotor automatically dependent upon variations in the speed of autorotation for moving said pivot means so as to tilt said flapping axes with respect to said hub and relatively to a horizontal plane in one direction to positively change said pitch angles in accordance with increased rotative speeds and for moving said pivot means so as to tilt said flapping axes in the opposite direction to negatively change said pitch angles in accordance with decreased rotative speeds, and additional means for overriding the action of said automatic means and for moving said pivot means so as to tilt said flapping axes in said one direction to positively change said pitch angles and thereby convert the rotary inertia of said blades into an increased lift force.

17. In an aerial device for retarding the descent of a body, the combination with said body of a rotor connected therewith and rotatable about a central normally vertical axis and in a predetermined direction which rotor includes a hub and also includes a plurality of generally radial blades, said rotor including pairs of transversely spaced blade supports on said hub for the respective blades one of which supports of each pair is relatively movable and said rotor also including pivot pins for said blades carried respectively by said pairs of supports and providing blade flapping axes and said blades initially having equal pitch angles providing suitable angles of air attack for causing autorotation of said rotor in said direction as the device descends, means on said rotor automatically dependent upon variations in the centrifugal action of said blades resulting from variations in the speed of autorotation for relatively moving said movable blade supports to tilt said pivot pins and said flapping axes with reseptct to said hub and relatively to a horizontal plane in one direction to positively change said pitch angles in accordance with increased rotative speeds and to tilt said pivot pins and said flapping axes in the opposite direction to negatively change said pitch angles in accordance with decreased rotative speeds, and addititional means for overriding the action of said automatic means and for moving said movable blade supports to tilt said pivot pins and said flapping axes with respect to said hub and relatively to a horizontal plane in said one direction to positively change said pitch angles and thereby convert the rotary inertia of said blades into an increased lift force.

References Cited in the file of this patent

UNITED STATES PATENTS 2,440,293     Stanley _____ Apr. 27, 1948

FOREIGN PATENTS 1,146,834     France _____ May 27, 1957